(12) United States Patent
Ma et al.

(10) Patent No.: US 11,067,510 B2
(45) Date of Patent: Jul. 20, 2021

(54) SYSTEM AND METHOD FOR ESTIMATING AND COMPENSATING FOR SAMPLE DRIFT DURING DATA ACQUISITION IN FLUORESCENCE MICROSCOPY

(71) Applicant: UNIVERSITY OF PITTSBURGH—OF THE COMMONWEALTH SYSTEM OF HIGHER EDUCATION, Pittsburgh, PA (US)

(72) Inventors: Hongqiang Ma, Pittsburgh, PA (US); Yang Liu, Sewickley, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 16/347,673

(22) PCT Filed: Nov. 17, 2017

(86) PCT No.: PCT/US2017/062125
§ 371 (c)(1),
(2) Date: May 6, 2019

(87) PCT Pub. No.: WO2018/102147
PCT Pub. Date: Jun. 7, 2018

(65) Prior Publication Data
US 2019/0271650 A1 Sep. 5, 2019

Related U.S. Application Data

(60) Provisional application No. 62/427,217, filed on Nov. 29, 2016.

(51) Int. Cl.
*G01N 21/64* (2006.01)
*G01N 21/27* (2006.01)
(Continued)

(52) U.S. Cl.
CPC ....... *G01N 21/6458* (2013.01); *G01N 21/274* (2013.01); *G01N 21/64* (2013.01);
(Continued)

(58) Field of Classification Search
CPC .. G01N 21/6458; G01N 21/274; G01N 21/64; G02B 21/008; G02B 21/16; G02B 21/362
(Continued)

(56) References Cited

U.S. PATENT DOCUMENTS 8,693,742 B2 4/2014 Piestun et al.
9,103,784 B1 8/2015 Sivasankar et al.
(Continued)

*Primary Examiner* — Mark R Gaworecki
(74) *Attorney, Agent, or Firm* — Philip E. Levy; Eckert Seamans Cherin & Mellot, LLC

(57) ABSTRACT

A method of estimating relative change of the 3D position of an object (e.g., sample drift in a microscopy system) having fiduciary markers that have an asymmetric joint point spread function distribution includes generating a plurality of calibration curves for each of the markers during a calibration phase including first calibration curves for a PSF width and second calibration curves for lateral bias. The method further includes capturing a first image of the markers during a data acquisition phase, generating a first joint 3D position for the markers using the first image, the first calibration curves and the second calibration curves, capturing a second image of the markers during the data acquisition phase, generating a second joint 3D position for the markers using the second image and the first and second calibration curves, and estimating the sample drift using the first joint 3D position and the second joint 3D position.

16 Claims, 5 Drawing Sheets

(51) Int. Cl.
  *G01N 21/01*  (2006.01)
  *G02B 21/00*  (2006.01)
  *G02B 21/36*  (2006.01)
  *G02B 21/16*  (2006.01)

(52) U.S. Cl.
  CPC ........... *G02B 21/008* (2013.01); *G02B 21/16* (2013.01); *G02B 21/362* (2013.01)

(58) Field of Classification Search
  USPC ...................................................... 250/459.1
  See application file for complete search history.

(56) References Cited

U.S. PATENT DOCUMENTS

| | | | |
|---|---|---|---|
| 10,215,975 B2* | 2/2019 | Piestun | G02B 21/12 |
| 2010/0278400 A1* | 11/2010 | Piestun | G02B 21/0076 |
| | | | 382/128 |
| 2014/0226881 A1* | 8/2014 | Piestun | G01N 21/6456 |
| | | | 382/128 |
| 2016/0195705 A1* | 7/2016 | Betzig | G01N 21/6458 |
| | | | 348/79 |
| 2016/0202185 A1* | 7/2016 | Zhuang | G02B 27/58 |
| | | | 250/459.1 |
| 2016/0231553 A1* | 8/2016 | Piestun | G02B 21/367 |
| 2016/0341946 A1* | 11/2016 | Wenger | G02B 21/361 |
| 2017/0038574 A1* | 2/2017 | Zhuang | G02B 21/0076 |
| 2018/0149855 A1* | 5/2018 | Chou | G06T 7/70 |

* cited by examiner

SYSTEM AND METHOD FOR ESTIMATING AND COMPENSATING FOR SAMPLE DRIFT DURING DATA ACQUISITION IN FLUORESCENCE MICROSCOPY

CROSS-REFERENCE TO RELATED APPLICATIONS

This application is a U.S. National Stage Application under 35 U.S.C. § 371 of International Application No. PCT/US2017/062125, filed on Nov. 17, 2017, entitled "System and Method for Estimating and Compensating for Sample Drift During Data Acquisition in Fluorescence Microscopy," which claims priority under 35 U.S.C. § 119(e) from U.S. provisional patent application No. 62/427,217, filed on Nov. 29, 2016, entitled "System and Method for Estimating and Compensating for Sample Drift During Data Acquisition in Fluorescence Microscopy," and filed on Nov. 29, 2016, the contents of which are incorporated herein by reference.

GOVERNMENT CONTRACT

This invention was made with government support under grant #s EB016657 and CA185363 awarded by the National Institutes of Health (NIH). The government has certain rights in the invention.

BACKGROUND OF THE INVENTION

1. Field of the Invention

The present invention relates to fluorescence microscopy, and, in particular, to a system and method for estimating and compensating for sample drift during data acquisition in fluorescence microscopy that uses nanoparticle-assisted three-dimensional nanometer localization.

2. Description of the Related Art

A fluorescence microscope is an optical microscope that uses fluorescence and phosphorescence instead of, or in addition to, reflection and absorption of light to study the properties of organic or inorganic substances. Fluorescence microscopy is one of the most widely used techniques to probe nanoscale macromolecular interactions, and may be used for both in vitro and in vivo imaging, such as single-particle tracking and super-resolution imaging. Example techniques include stochastic optical reconstruction microscopy (STORM), photo-activated localization microscopy (PALM) and fluorescence photo-activated localization microscopy (FPALM).

Motion blur caused by sample drift is one of the major distortion sources in fluorescence microscopy. Motion blur can either lower the accuracy to localize the position of single particles and/or degrade the resolution in the reconstructed super-resolution images. Sample drift, which may be caused by various sources such as mechanical vibration and thermal expansion, is often difficult to avoid, especially when long acquisition time is required.

As a result, various methods have been developed to compensate for sample drift during data acquisition.

Known sample drift compensation methods can be classified into two main categories. The first category employs posterior image processing approaches based on image registration. These methods are very easy to implement and do not require any modification to the optical imaging setup. In several cases, these methods have shown satisfactory performance, and hence they are gaining popularity. However, the performance of these methods rely heavily on the sample itself, and when the number of labeled molecules is small, their performance decreases severely. The other category is fiduciary marker based methods that mainly rely on tracking the positions of fiduciary markers, such as gold nanoparticles, that are attached to the surface of a coverslip placed on a slide holding a specimen to determine the sample drift. These methods are more robust and reliable, but require the imaging plane to be close to the markers (within 1 micron), which limit their performance when imaging thicker samples.

Importantly, without adding additional optics, both types of methods discussed above can only be used to track lateral (2D) positions of samples. With regard to fiduciary marker based methods, to track the axial position of the fiduciary markers, additional optical elements are required (e.g., a cylindrical lens, a phase mask, and/or multifocal optics) to encode the axial position of the marker by the shape of its point spread function (PSF). Such additional optical elements significantly increase the complexity and cost of an optical imaging setup. Alternatively, high-end commercial fluorescence microscopy systems offer hardware-based online drift correction modules (e.g., the Perfect Focus System from Nikon) that are based on detecting the reflection between glass and sample to maintain nanoscale stability in the axial direction. The main drawbacks of the commercial systems are: (1) they require the addition of complex optics at a higher cost; (2) the correction is only made in the axial direction, and additional methods are needed (e.g., fiduciary marker, post image registration algorithm) to correct for the lateral drift; and (3) they do not work when the refractive index between the mounting medium and sample is closely matched.

Existing drift correction methods have routinely shown precision in the lateral position of <10 nm and in the axial position of ~20-30 nm. A recent report demonstrated state-of-the-art overall correction precision of ~1.3 nm in the lateral position and ~6 nm in the axial position using the phase response of the nanoparticles. However, additional illumination light, optical components and special detectors are required and complicate the optical system. In addition, and, more importantly, the drift correction performance of such a method severely degrades as imaging depth increases, which limits its widespread use to study various biological problems.

SUMMARY OF THE INVENTION

In one embodiment, a method of estimating the relative change of the three dimensional position of an object having a plurality of fiduciary markers associated with therewith. In the method, the fiduciary markers have a joint point spread function distribution that is asymmetric. The method includes generating a plurality of calibration curves for each of the plurality of fiduciary markers using a number of calibration images of the plurality of fiduciary markers (e.g., captured by a microscopy system) at a plurality of axial positions (z) during a calibration phase, wherein for each of the plurality of fiduciary markers the calibration curves include a number of first calibration curves for a point spread function (PSF) width for the fiduciary marker and a number of second calibration curves for a lateral bias of the fiduciary marker. The method further includes capturing a first image of the plurality of fiduciary markers during a data acquisition phase, generating a first joint 3D position for the plurality of fiduciary markers using the first image, the number of first calibration curves and the number of second calibration curves, capturing a second image of the plurality of fiduciary markers during the data acquisition phase, generating a second joint 3D position for the plurality of fiduciary markers using the second image, the number of first calibration curves and the number of second calibration curves, and estimating the relative change of the three dimensional 3D position using the first joint 3D position and the second joint 3D position.

In one particular embodiment, the estimating the relative change comprises estimating sample drift in a microscopy system for the object, wherein the object is a sample in the microscopy system. In this particular embodiment, the number of calibration images of the plurality of fiduciary markers are captured by the microscopy system during the calibration phase, and the estimating the relative change comprises estimating the sample drift using the first joint 3D position and the second joint 3D position.

In another embodiment, a microscopy system for capturing images of a sample having a plurality of fiduciary markers associated with the sample is provided, wherein the plurality of fiduciary markers have a joint point spread function distribution that is asymmetric. The microscopy system includes a light source, a positioning stage, a detector, and a control system coupled to the light source, the positioning stage and the detector. The control system is structured and configured to: generate a plurality of calibration curves for each of the plurality of fiduciary markers using a number of calibration images of the plurality of fiduciary markers captured by the microscopy system at a plurality of axial positions (z) during a calibration phase, wherein for each of the plurality of fiduciary markers the calibration curves include a number of first calibration curves for a point spread function (PSF) width for the fiduciary marker and a number of second calibration curves for a lateral bias of the fiduciary marker; capture a first image of the plurality of fiduciary markers during a data acquisition phase; generate a first joint 3D position for the plurality of fiduciary markers using the first image, the number of first calibration curves and the number of second calibration curves; capture a second image of the plurality of fiduciary markers during the data acquisition phase; generate a second joint 3D position for the plurality of fiduciary markers using the second image, the number of first calibration curves and the number of second calibration curves; and estimate the sample drift using the first joint 3D position and the second joint 3D position.

DETAILED DESCRIPTION OF EXEMPLARY EMBODIMENTS

Figure 1:
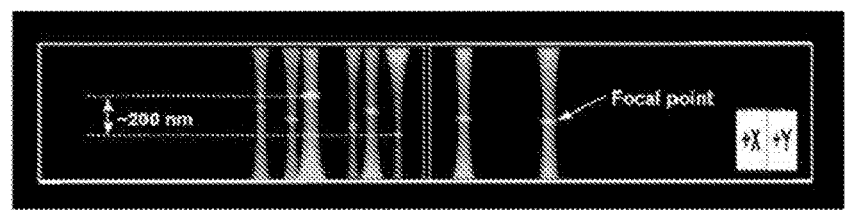
FIG. 1 is a schematic diagram showing the axial position of fiduciary markers attached to a coverslip surface according to an aspect of the disclosed concept.

As used herein, the singular form of "a", "an", and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. One or more components can reside within a process and/or thread of execution, and a component can be localized on one computer and/or distributed between two or more computers.

As used herein, the term "calibration curve" shall mean a function which provides a measure of a parameter indirectly, giving values for the desired parameter as a function of the value of one or more measured variables Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the disclosed concept. It will be evident, however, that the disclosed concept can be practiced without these specific details without departing from the spirit and scope of the disclosed concept.

The disclosed concept provides a high-precision single-molecule localization microscopy (SMLM, a type of super-resolution imaging system) method that does not require additional light sources, optics and/or detectors. The disclosed concept can routinely limit the effect of motion blur to be <2 nm in the lateral direction and <5 nm in the axial direction during the entire data acquisition process, without limiting the imaging plane to the coverslip surface. This method can be used either as an alternative drift correction method in commercial super-resolution systems in cases where the system's own method fails to perform (e.g., closely matched refractive index between mounting medium and sample, small number of targeted molecules, high-precision (<5 nm) applications). Alternatively, since it does not require additional optics, this method can be applied to conventional fluorescence microscopy systems available in most laboratories for super-resolution applications.

As described herein, the high-precision super-resolution imaging method of the disclosed concept relies on maintaining nanometer precision in the 3D position of the sample during image acquisition by tracking the position of fiduciary markers on the coverslip without any additional light sources, optics and/or detectors. As noted elsewhere herein, in conventional approaches, only the lateral 2D position can be accurately determined by fitting the image pattern of fiduciary markers (e.g., gold nanoparticles) with the Gaussian function model. To obtain the axial position, additional optical elements (e.g., a cylindrical lens, a phase mask, and/or multifocal optics) are required to encode the axial position of the marker by the shape of its point spread function. Otherwise, the axial position of the markers cannot be determined because the image pattern appears identical when the fiduciary markers are located at the upper and the lower focal planes. However, this fact holds only if one fiduciary marker is in the entire field of view or if all of the fiduciary markers are on the exact same focal plane. In practice, the surface of the substrate (i.e., coverslip) on which fiduciary markers are positioned is not entirely flat, and such imperfection creates the opportunity to precisely locate 3D position without adding any additional optics. The disclosed concept recognizes that, as shown in FIG. 1, the axial position of fiduciary markers attached to a coverslip surface are located at different depths. As a result, the joint point spread function distribution of the markers is asymmetric, suggesting that the joint 3D position of these fiduciary markers can be precisely determined without encoding the axial information to the shape of the single point spread function via additional optics.

Figure 2:
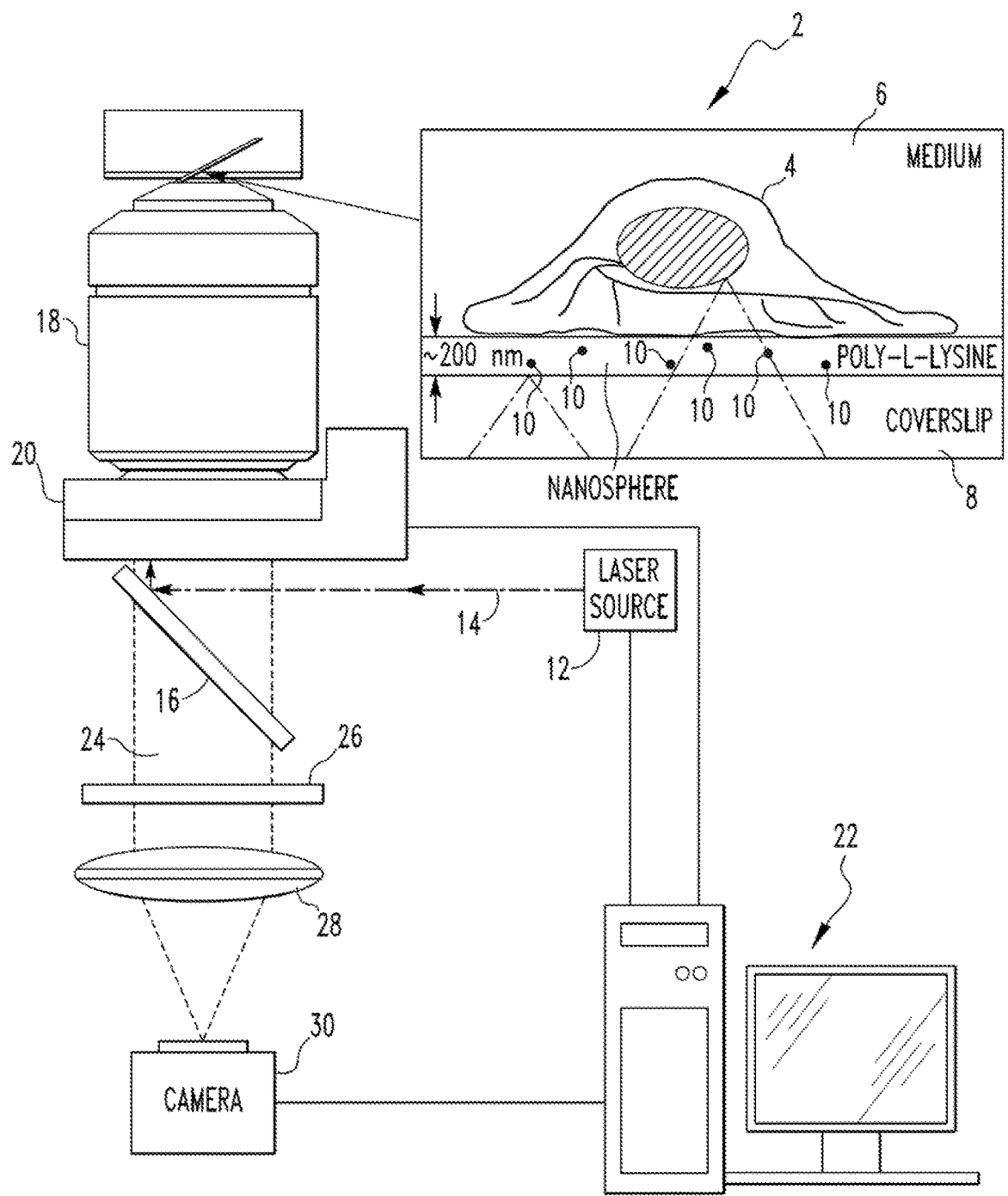
FIG. 2 is a schematic diagram of a fluorescence microscopy system according to an exemplary embodiment of the disclosed concept.

FIG. 2 is a schematic diagram of a fluorescence microscopy system 2 according to an exemplary embodiment of the disclosed concept. Fluorescent microscopy system 2 is structured and configured to obtain images (i.e., two dimensional images) from a sample 4 that, in the exemplary illustrated embodiment, is provided within a dish 6 covered by a coverslip 8. As seen in FIG. 2, a number of nanoparticles 10 (e.g., gold nanoparticles) are provided on the top surface of coverslip 8.

Fluorescence microscopy system 2 includes a laser source 12 for generating illumination light 14. Fluorescence microscopy system 2 further includes a dichroic mirror 16 which directs the illumination light 14 to an objective lens system 18 supported by a nanoposition stage 20. Both laser source 12 and nanoposition stage 20 are operatively coupled to a control system 22 that controls the operation thereof. Objective lens system 18 is structured to direct illumination light 14 to sample 4 in order to illuminate sample 4 and cause it to emit light 24 of certain wavelengths different than illumination light 14. Nanposition stage 20 is structured to selectively move objective lens system 18 in the lateral (x, y,) and axial (z) directions under the control of control system 22. Fluorescence microscopy system 2 also includes an emission filter 26 which separates the emitted light 24 from the illumination light 14. A tube lens 28 is provided to direct emitted light 24 to a detector 30 which, in the illustrated exemplary embodiment, is a digital camera. Detector 30 is coupled to control system 22 to control the operation thereof and to receive data therefrom (i.e. data relating to the two dimensional images that are captured).

Figure 3:
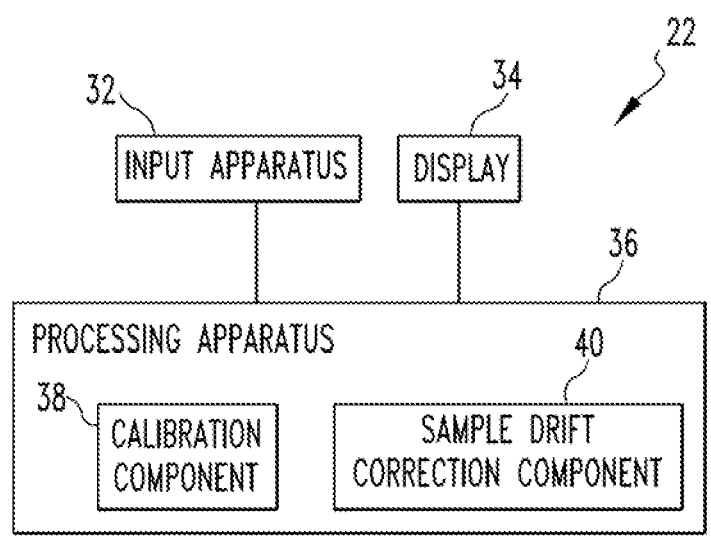
FIG. 3 is a schematic diagram of an exemplary control system according to an exemplary embodiment of the disclosed concept.

In addition, control system 22 is structured and configured to implement the method according to the disclosed concept for compensating for sample drift during data acquisition which is described in greater detail herein. FIG. 3 is a schematic diagram of an exemplary control system 22 according to an exemplary embodiment of the disclosed concept. As seen in FIG. 3, control system 22 is a computing device structured to receive digital image data representing a number of images generated by detector 30 and process that data as described herein. Control system 22 may be, for example and without limitation, a PC, a laptop computer, or any other suitable device structured to perform the functionality described herein. Control system 22 includes an input apparatus 32 (such as a keyboard), a display 34 (such as an LCD), and a processing apparatus 36. A user is able to provide input into processing apparatus 36 using input apparatus 32, and processing apparatus 36 provides output signals to display 32 to enable display 32 to display information to the user (such as images generated from sample 4) as described in detail herein. Processing apparatus 36 comprises a processor and a memory. The processor may be, for example and without limitation, a microprocessor (μP), a microcontroller, or some other suitable processing device, that interfaces with the memory. The memory can be any one or more of a variety of types of internal and/or external storage media such as, without limitation, RAM, ROM, EPROM(s), EEPROM(s), FLASH, and the like that provide a storage register, i.e., a non-transitory machine readable medium, for data storage such as in the fashion of an internal storage area of a computer, and can be volatile memory or nonvolatile memory. The memory has stored therein a number of routines (comprising computer executable instructions) that are executable by the processor, including routines for implementing the disclosed concept as described herein. In particular, processing apparatus 36 includes a calibration component 38 configured for generating calibration curves as described herein based on received image data, and a sample drift correction component 40 configured for measuring and/or compensating for sample drift during data acquisition as described herein.

The method for estimating and compensating for sample drift during data acquisition according to the disclosed concept will now be described in detail. For illustrative purposes, the method will be described in connection with the exemplary fluorescence microscopy system 2 shown in FIG. 2 using the example sample 4, dish 6, coverslip 8, and fiduciary markers 10. The method includes two phases. The first phases is a calibration phase wherein certain calibration curves are generated from a number of images captured by fluorescence microscopy system 2. The second phases is an online drift estimation and correction phase, wherein the generated calibration curves are used to estimate and correct for sample drift during data acquisition using fluorescence microscopy system 2.

1. Calibration.

As noted above, the purpose of the calibration phase of the disclosed method is to build a number of calibration curves that will then be used in the online drift estimation and correction phase of the disclosed method. Specifically, during the calibration phase, four different calibration curves, each being a function of axial position z, are generated for each of the n individual fiduciary markers 10 (the total number of fiduciary markers 10 being N). More specifically, the following four calibration curves are built for each of the n fiduciary markers 10: (i) $F_{x_c}(z)$, which is a calibration curve for the PSF center location in the x dimension, (ii) $F_{x_c}(z)$, which is a calibration curve for the PSF center location in the y dimension, (iii) $F_{w_x}(z)$, which is a calibration curve for the PSF width in the x dimension, and (iv) $F_{w_y}(z)$, which is a calibration curve for the PSF width in the y dimension.

Figure 4:
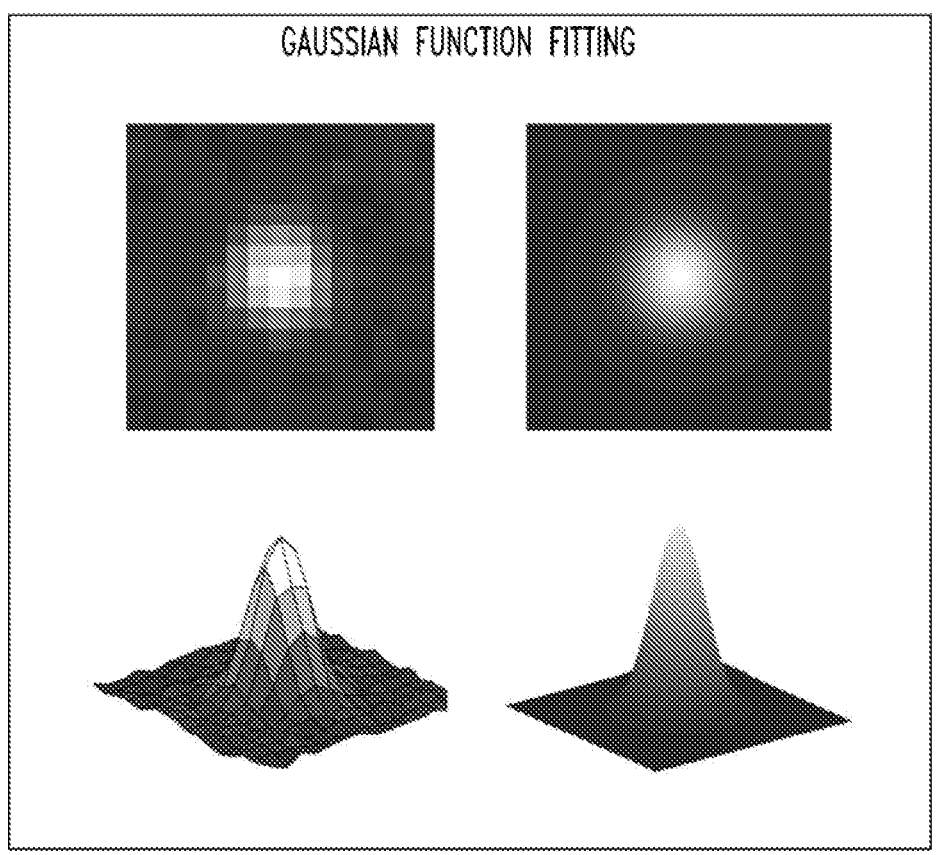
FIG. 4 is a schematic diagram showing the 2D intensity distribution of PSF from a single fiduciary marker on the left side of the figure and the corresponding 2D intensity distribution of the fitted Gaussian function on the right side of the figure according to an aspect of the disclosed concept.
Figure 5A:
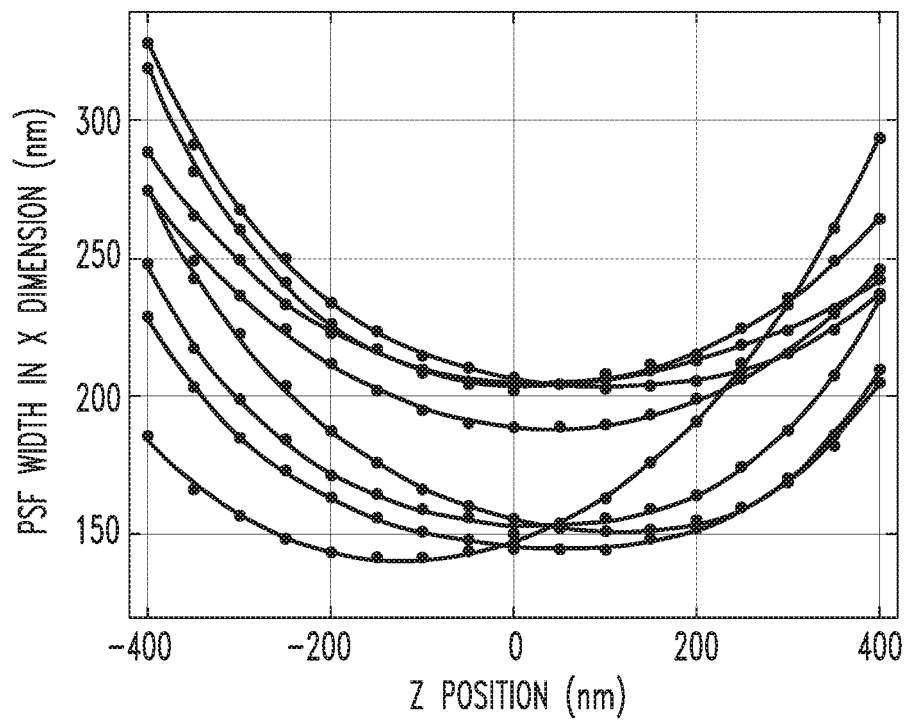
FIGS. 5A, 5B, 5C and 5D illustrate exemplary calibration curves according to an embodiment of the disclosed concept.
Figure 5B:
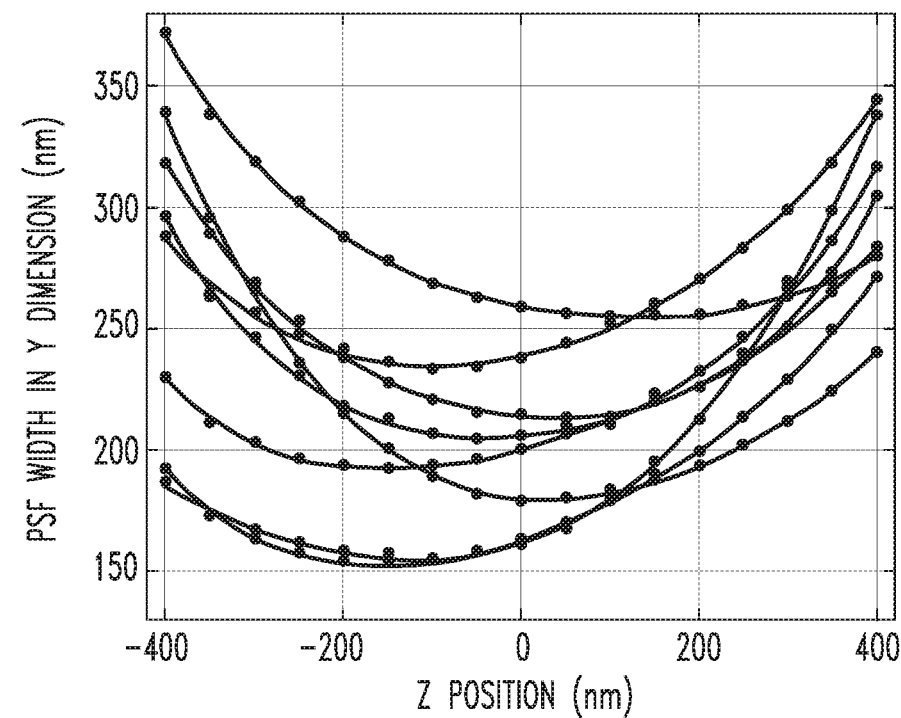
Figure 5C:
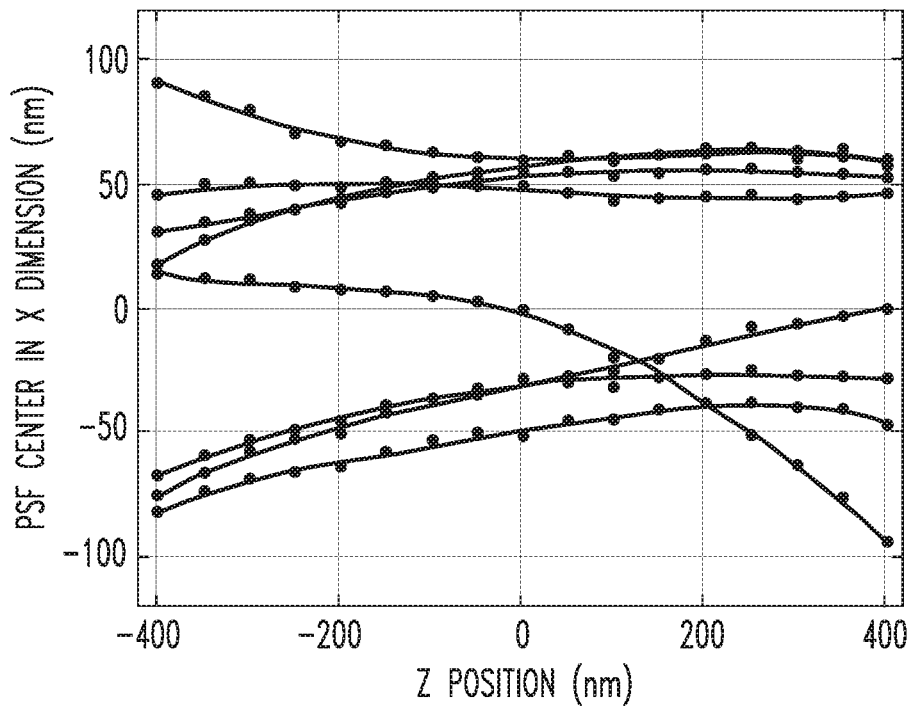
Figure 5D:
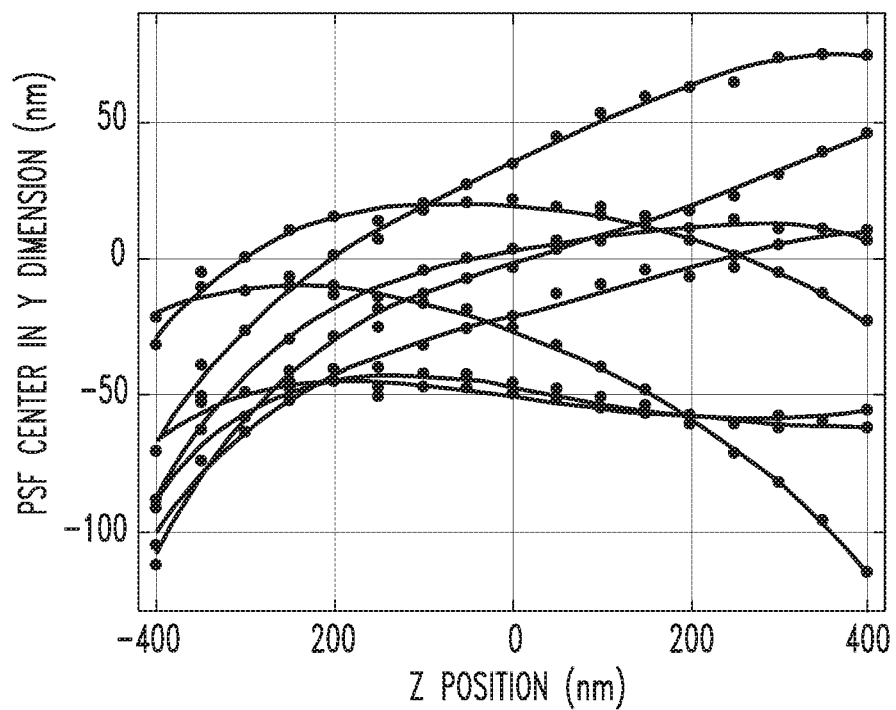

In the exemplary embodiment, the above-described calibration curves are built as follows. First, a series of images of the fiduciary markers 10 are captured by fluorescence microscopy system 2 at a plurality of different axial positions set by nanoposition stage 20 under control of control unit 22. In the exemplary embodiment, the zero reference axial position is defined as the focal plane of the fiduciary markers 10 where most of the fiduciary markers 10 show minimal PSF width. Note, however, that the zero reference axial position can alternatively be defined as another axial position without adversely affecting the correction performance of the disclosed method. Next, after the plurality of images have been captured, the center location of the PSF and the width of the PSF of each marker at each axial position is retrieved. In the exemplary embodiment, those values are retrieved by fitting with the 2D elliptical Gaussian function, expressed by the following equation:

$$I(x, y, n) = \frac{P}{2\pi w_x(n) w_y(n)} \exp\left[-\left(\frac{(x(n) - x_c(n))^2}{2(w_x(n))^2} + \frac{(y(n) - y_c(n))^2}{2(w_y(n))^2}\right)\right] + B,$$

where (x,y) is the spatial coordinate of $n^{th}$ marker, I is the intensity distribution, ($x_c(n)$, $y_c(n)$) is the lateral center location of the $n^{th}$ marker, ($w_x(n)$, $w_y(n)$) is the width of the PSF in the x and y dimensions for $n^{th}$ marker, P is the total photon numbers, and B is the background. FIG. 4 illustrates the 2D intensity distribution of PSF from a single fiduciary marker 10 (e.g., a 100 nm gold nanoparticle) on the left side of the figure and the corresponding 2D intensity distribution of the fitted Gaussian function on the right side of the figure. Then, for each of then fiduciary markers 10, the width (in the x and y dimensions) and the center localization (in the x and y dimensions) of the PSF as a function of different axial positions (z) are plotted, which define each of the calibration curves. An example of such plotting for eight exemplary fiduciary markers 10 is shown in FIGS. 5A-5D. Then, a 4th-order polynomial is used to fit each of the four calibration curves ($F_{x_c}(n,z)$, $F_{y_c}(n,z)$, $F_{w_x}(n,z)$ and $F_{w_y}(n,z)$) for the $n^{th}$ marker.

Note that, if fluorescence microscopy system 2 and the emission properties of fiduciary markers 10 were perfect, only the width of PSF will change with the axial position, but not the center location of PSF. Under such ideal conditions, the two calibration curves in FIGS. 5C and 5D would not be needed. However, in practice (especially when gold nanoparticles are used as fiduciary markers 10), the PSF center generally varies slowly at different axial positions. That variance will affect the precision of the determination of the location of the fiduciary marker 10. Therefore, in practice, the calibration curves of the PSF center locations ($F_{x_c}(n,z)$, $F_{y_c}(n,z)$) are needed to correct this error.

2. Online Drift Estimation and Correction

After the calibration curves for the set of N fiduciary markers of the coverslip 8 associated with a particular sample 4 are built as just described, the sample drift may be estimated via an online drift correction method that is described in detail below.

First, nanoposition stage 20 is moved to an axial position z under control of control system 22. Then, the center location ($x_c(n)$, $y_c(n)$) of the PSF and the width ($w_x(n)$, $w_y(n)$) of the PSF in the x and y dimensions for each fiduciary marker 10 in the set of N fiduciary markers 10 are retrieved by 2D Gaussian function fitting as described above. Thus, as a result of this step, N center locations ($x_c(n)$, $y_c(n)$) and N width ($w_x(n)$, $w_y(n)$) will be obtained.

Next, a "joint" or "combined" axial position ($z_{joint}$) of the whole set of N markers is calculated by taking the positions of the whole set of N fiduciary markers 10 into account and by defining the joint axial position $z_{joint}$ as the axial position where the difference on the PSF width of the calibration curves for a set of all N fiduciary markers 10 is at a minimum. That axial position is, in the exemplary embodiment, found via an optimization problem using the following equation:

$$z_{joint} = \arg\min \sum_{n=1}^{N} \sqrt{(w_x(n) - F_{w_x}(n, z))^2 + (w_y(n) - F_{w_y}(n, z))^2}$$

Next, the calculated joint axial position $z_{joint}$ is used to calculate the center bias for each fiduciary marker 10 via the calibration curves of $F_{x_c}(n, z_{joint})$ and $F_{y_c}(n, z_{joint})$. The calculated center biases are then subtracted from the retrieved center location ($x_c(n)$, $y_c(n)$) of each fiduciary marker 10 to obtain a precise/bias adjusted estimate of the center location ($x_c(n, z_{joint})$, $y_c(n, z_{joint})$) each fiduciary marker 10.

Then, a "joint" or "combined" center lateral location (in the x and y dimensions) for the whole set of N fiduciary markers 10 can be found using the equations below:

$$\begin{cases} x_{joint}(z_{joint}) = \sum_{n=1}^{N} (x_c(n) - F_{x_c}(n, z_{joint}) - x_0(n))/n \\ y_{joint}(z_{joint}) = \sum_{n=1}^{N} (y_c(n) - F_{y_c}(n, z_{joint}) - y_0(n))/n \end{cases}$$

The above described process will thus result in the generation of a single joint 3D position ($z_{joint}$, $x_{cjoint}$, $y_{cjoint}$) for all of the N fiduciary markers 10 on coverslip 8. 3D position drift during data acquisition may then be calculated as the position difference between the joint 3D positions determined from two different images obtained by fluorescence microscopy system 2 during the data acquisition process. The process may be repeated for each imaging frame or, alternatively, for each set of imaging frames (e.g., drift correction every 200 imaging frames). The determined position drift in the z direction may be used to adjust nanoposition stage 20 to correct axial drift, and the determined drift in the x and y directions may be used in data reconstruction steps to correct for lateral drift.

Figure 6:
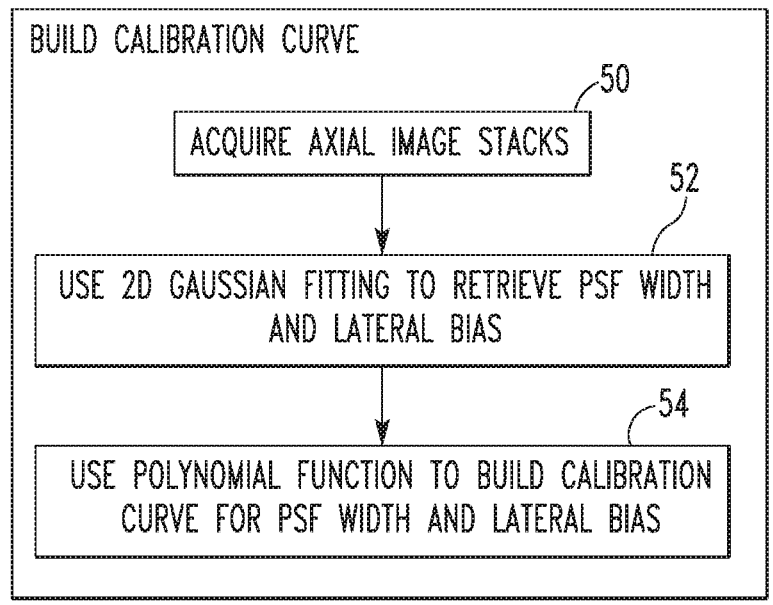
FIG. 6 is a flowchart that summarizes the calibration phase of the method of the disclosed concept.

FIG. 6 is a flowchart that summarizes the calibration phase of the method of the disclosed concept. At step 50, an axial image stack is acquired using fluorescence microscopy system 2 as described herein. Next, at step 52, 2D Gaussian fitting is used to retrieve PSF width and lateral bias information for the fiduciary markers. Finally, at step 54, a polynomial function is used to build calibration curves for PSF width and lateral bias.

Figure 7:
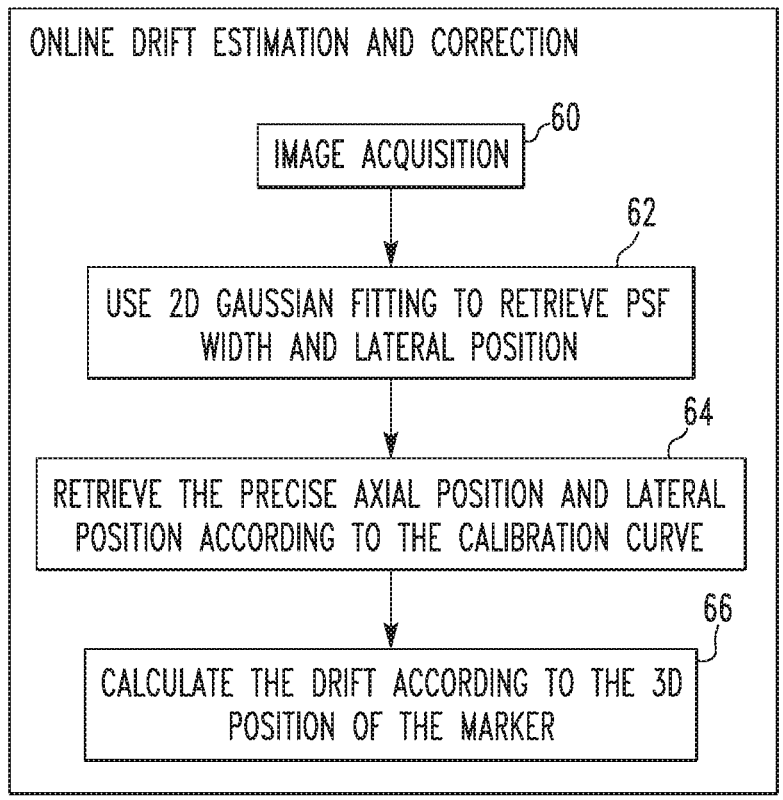
FIG. 7 is a flowchart that summarizes the online drift estimation and correction phase of the method of the disclosed concept.

FIG. 7 is a flowchart that summarizes the online drift estimation and correction phase of the method of the disclosed concept. At step 60, an image is acquired using fluorescence microscopy system 2. Then, at step 62, 2D Gaussian fitting is used to retrieve PSF width and lateral position information for the fiduciary markers in the captured image. Then, at step 64, precise axial position and lateral position information for the fiduciary markers is retrieved using the calibration curves. Finally, at step 66, the sample drift is calculated according to joint 3D positions of the markers determined using the calibration curves.

When the imaging plane is located at a different focal plane from that of fiduciary markers (e.g., located at several microns above the surface of the coverslip and the markers are already out of focus), a "jump" strategy may be used to estimate sample drift. In particular, at a set time interval, the focal plane jumps to the focal plane of the markers to record their PSF pattern, calculate the sample drift according to the above described method, compensate the sample drift, and return back to the imaging plane for subsequent imaging. The axial drift has to be corrected online, but the lateral drift can be corrected either online if a motorized translational stage is used or post processing (during super-resolution image reconstruction).

While the disclosed concept has been described in connection with fluorescence microscopy system 2, it will be understood that that is meant to be exemplary only and that the disclosed concept may be employed with other types of microscopy systems that employ fiduciary markers. Furthermore, while the disclosed concept has been described in connection with an exemplary methodology for estimating sample drift in a microscopy system, it will be further understood that that is meant to be exemplary only and that the disclosed concept may be employed for estimating the relative change of the three dimensional position of other objects having a plurality of fiduciary markers associated with therewith.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method of estimating a relative change of a three dimensional position of an object having a plurality of fiduciary markers associated with the object, the plurality of fiduciary markers having a joint point spread function distribution that is asymmetric, the method comprising:

generating a plurality of calibration curves for each of the plurality of fiduciary markers using a number of calibration images of the plurality of fiduciary markers captured at a plurality of axial positions (z) during a calibration phase, wherein for each of the plurality of fiduciary markers the calibration curves include a number of first calibration curves for a point spread function (PSF) width for the fiduciary marker and a number of second calibration curves for a lateral bias of the fiduciary marker;

capturing a first image of the plurality of fiduciary markers during a data acquisition phase;

generating a first joint 3D position for the plurality of fiduciary markers using the first image, the number of first calibration curves and the number of second calibration curves;

capturing a second image of the plurality of fiduciary markers during the data acquisition phase;

generating a second joint 3D position for the plurality of fiduciary markers using the second image, the number of first calibration curves and the number of second calibration curves; and estimating the relative change of the three dimensional 3D position using the first joint 3D position and the second joint 3D position.

2. The method according to claim 1, wherein the estimating the relative change comprises estimating sample drift in a microscopy system for the object, wherein the object is a sample in the microscopy system, wherein the number of calibration images of the plurality of fiduciary markers are captured by the microscopy system during the calibration phase, and wherein the estimating the relative change comprises estimating the sample drift using the first joint 3D position and the second joint 3D position.

3. The method according to claim 2, further comprising using the estimated sample drift to correct for sample drift error during the data acquisition phase.

4. The method according to claim 3, wherein the number of first calibration curves for each of the plurality of fiduciary markers includes a calibration curve $F_{wx}(z)$ for the PSF width in an x dimension for the fiduciary marker and a calibration curve $F_{wy}(z)$ for the PSF width in a y dimension for the fiduciary marker, and wherein the number of second calibration curves for each of the plurality of fiduciary markers includes a calibration curve $F_{xc}(z)$ for a PSF center location in the x dimension for the fiduciary marker and a calibration curve $F_{yc}(z)$ for the PSF center location in the y dimension for the fiduciary marker.

5. The method according to claim 2, further comprising determining using the calibration images a center location of the PSF in an x and a y dimension and the width of the PSF in the x and y dimensions for each of the plurality of fiduciary markers at each of the axial positions by fitting with a 2D elliptical Gaussian function, wherein the generating the plurality of calibration curves for each of the plurality of fiduciary markers includes using a 4th-order polynomial to fit each of the calibration curves using the determined center location in the x and y dimensions of the PSF and the determined width of the PSF in the x and y dimensions for each of the plurality of fiduciary markers at each of the axial positions.

6. The method according to claim 2, wherein the generating the first joint 3D position comprises determining, using the first image, a center location of the PSF in an x and a y dimension and the width of the PSF in the x and y dimensions for each of the plurality of fiduciary markers, and determining a joint axial position ($z_{joint}$) of the plurality of fiduciary markers by defining the joint axial position $z_{joint}$ as an axial position where a difference on the PSF width of the first calibration curves for all of the fiduciary markers is at a minimum.

7. The method according to claim 6, further comprising using the joint axial position $z_{joint}$ to calculate a center bias for each of the plurality of fiduciary markers using the second calibration curves and subtracting the center biases from the center location of each of the fiduciary markers to obtain a precise estimate of the center location of each of the fiduciary markers, and determining a joint center lateral location in the x and y dimensions for the plurality of fiduciary markers using the second calibration curves, wherein the first joint 3D position comprises the joint axial position $z_{joint}$ and the joint center lateral location in the x and y dimensions.

8. The method according to claim 2, wherein the microscopy system is a fluorescence microscopy system.

9. A computer program product including a non-transitory computer readable medium encoded with a computer program comprising program code for implementing the method of claim 1.

10. A microscopy system for capturing images of a sample having a plurality of fiduciary markers associated with the sample, the plurality of fiduciary markers having a joint point spread function distribution that is asymmetric, comprising:
   a light source;
   a positioning stage;
   a detector; and
   a control system coupled to the light source, the positioning stage and the detector, wherein the control system is structured and configured to:
   generate a plurality of calibration curves for each of the plurality of fiduciary markers using a number of calibration images of the plurality of fiduciary markers captured by the microscopy system at a plurality of axial positions (z) during a calibration phase, wherein for each of the plurality of fiduciary markers the calibration curves include a number of first calibration curves for a point spread function (PSF) width for the fiduciary marker and a number of second calibration curves for a lateral bias of the fiduciary marker;
   capture a first image of the plurality of fiduciary markers during a data acquisition phase;
   generate a first joint 3D position for the plurality of fiduciary markers using the first image, the number of first calibration curves and the number of second calibration curves;
   capture a second image of the plurality of fiduciary markers during the data acquisition phase;
   generate a second joint 3D position for the plurality of fiduciary markers using the second image, the number of first calibration curves and the number of second calibration curves; and
   estimate the sample drift using the first joint 3D position and the second joint 3D position.

11. The microscopy system according to claim 10, wherein the control system is further structured and configured to use the estimated sample drift to correct for sample drift error during the data acquisition phase.

12. The microscopy system according to claim 11, wherein the number of first calibration curves for each of the plurality of fiduciary markers includes a calibration curve $F_{wx}(z)$ for the PSF width in an x dimension for the fiduciary marker and a calibration curve $F_{wy}(z)$ for the PSF width in a v dimension for the fiduciary marker, and wherein the number of second calibration curves for each of the plurality of fiduciary markers includes a calibration curve $F_{xc}(z)$ for a PSF center location in the x dimension for the fiduciary marker and a calibration curve $F_{yc}(z)$ for the PSF center location in the y dimension for the fiduciary marker.

13. The microscopy system according to claim 10, wherein the control system is further structured and configured to determine, using the calibration images, a center location of the PSF in an x and a y dimension and the width of the PSF in the x and y dimensions for each of the plurality of fiduciary markers at each of the axial positions by fitting with a 2D elliptical Gaussian function, wherein the plurality of calibration curves for each of the plurality of fiduciary markers are generated using a 4th-order polynomial to fit each of the calibration curves using the determined center location in the x and y dimensions of the PSF and the determined width in the x and y dimensions of the PSF for each of the plurality of fiduciary markers at each of the axial positions.

14. The microscopy system according to claim 10, wherein the first joint 3D position is generated by determining, using the first image, a center location of the PSF in an x and ay dimension and the width of the PSF in the x and y dimensions for each of the plurality of fiduciary markers, and determining a joint axial position ($z_{joint}$) of the plurality of fiduciary markers by defining the joint axial position $z_{joint}$ as an axial position where a difference on the PSF width of the first calibration curves for all of the fiduciary markers is at a minimum.

15. The microscopy system according to claim 14, wherein the control system is further structured and configured to use the joint axial position $z_{joint}$ to calculate a center bias for each of the plurality of fiduciary markers using the second calibration curves and subtract the center biases from the center location of each of the fiduciary markers to obtain a precise estimate of the center location of each of the fiduciary markers, and determine a joint center lateral location in the x and y dimensions for plurality of fiduciary markers using the second calibration curves, wherein the first joint 3D position comprises the joint axial position $z_{joint}$ and the joint center lateral location in the x and v dimensions.

16. The microscopy system according to claim 10, wherein the microscopy system is a fluorescence microscopy system.

* * * * *